United States Patent [19]

Kagano

[11] 4,337,493
[45] Jun. 29, 1982

[54] MAGNETIC RECORDING TAPE CARTRIDGE

[75] Inventor: Shinichi Kagano, Kyoto, Japan

[73] Assignee: Hitachi Maxell, Ltd., Osaka, Japan

[21] Appl. No.: 273,412

[22] Filed: Jun. 15, 1981

Related U.S. Application Data

[63] Continuation of Ser. No. 50,210, Jun. 20, 1979, abandoned.

[30] Foreign Application Priority Data

Jun. 20, 1978 [JP] Japan .......................... 53/85995[U]

[51] Int. Cl.³ ............................................. G11B 23/04
[52] U.S. Cl. ............................... 360/130.33; 360/132; 360/130.32
[58] Field of Search ............. 360/132, 130.33, 130.32, 360/129, 128; 242/197–200

[56] References Cited

U.S. PATENT DOCUMENTS 3,529,788 9/1970 Minoru ................................. 242/199
3,789,157 1/1974 Greiner et al. ................. 360/130.33
3,851,115 11/1974 Zacaroli ......................... 360/130.33

FOREIGN PATENT DOCUMENTS 2110400 10/1971 Fed. Rep. of Germany ...... 360/132

Primary Examiner—John H. Wolff
Attorney, Agent, or Firm—Birch, Stewart, Kolasch & Birch

[57] ABSTRACT

The present invention is directed to a magnetic recording tape cartridge having a tape chamber for containing a recording tape, the intermediate portion of the recording tape being adapted to advance along a predetermined path defined along a plurality of openings defined in the front wall of the chamber. A magnetic shielding plate and pad device composed of a resilient plate are positioned in the tape chamber disposed to face one of the openings to which a recording tape head of a tape player is inserted and a pair of stepped ribs are provided extending in a backward direction from positions near the front wall with such a height that portions of the ribs are closely opposed to the bottom edge of the plate of the pad device so that the pad device is held in the required position. The ribs are further designed to support the level of the recording tape and secure the positioning of the shielding plate.

3 Claims, 6 Drawing Figures

4,337,493

MAGNETIC RECORDING TAPE CARTRIDGE

This application is a continuation of copending application Ser. No. 50,210, filed on June 20, 1979, now abandoned.

BACKGROUND OF THE INVENTION

The present invention relates to a magnetic recording tape cartridge, and more particularly to an improvement of a magnetic recording tape cartridge having a pad device for giving pressure contact of the magnetic recording tape to the magnetic head of a tape recorder.

U.S. Pat. No. 3,529,788 discloses an example of a recording tape cartridge provided with a magnetic shielding plate and a pad device.

Detailed construction of essential portions of the conventional magnetic recording tape cartridge of the prior art as mentioned above is illustrated in FIG. 1 and FIG. 2, wherein a magnetic shielding plate 100 and a pad device 101 composed of a resilient plate 102 and a cubic cushioning pad 103 are disposed in parallel facing an opening 104 defined in front wall 109 of the cartridge 105 for receiving a magnetic head (not shown) of a tape recorder.

In a process of making a cartridge commercially, the magnetic shielding plate 100 is installed by mounting its bent ends 100a on a pair of base pieces 106 protruding from tape guiding pins 107 and the plate 100 is clamped by backward ends 108a of a pair of ribs 108 extending in a backward direction from the front wall 109 and a boss 110.

After installation of the plate 100, the pad device 101 is installed relative to said base pieces 106 by inserting both end portions of the resilient plate 102 within the gaps defined by the guide pins 107 and both bent ends 100a of the plate 100.

Under such a situation, during the process of installation of these elements, if the magnetic shielding plate 100 shifts upward even to a slight degree due to vibration or shock of intermittent movements of a conveyer by which the respective cartridges are transferred, a gap G between the base pieces 106 and the bent ends 100a of the magnetic shielding plate 100 is created as shown by the dot-dash lines A in FIG. 2 and the plate 102 of the pad device 101, which originally tends to be inclined in a forward direction, falls into said gap G as shown by the dot-dash lines B with the result that the procedure of installation of these elements into the cartridges must be stopped.

The above mentioned magnetic shielding plate 100 which is inserted in the receiving groove formed on the lower case 111 with some play tends to move idly in both the forward or backward directions and in the lateral directions. Therefore, such lateral movement, i.e., leftward and rightward directions of the magnetic shielding plate 100, tends to cause such problems that the pad device 101 is displaced away from the guide pins 107, resulting in failure of exertion of the required contact pressure on the recording tape and the recording head.

SUMMARY OF THE INVENTION

The present invention makes it possible to eliminate the problems which are inherent in the conventional magnetic recording tape cartridge as described above.

It is, therefore, an essential object of the present invention to provide a magnetic recording tape cartridge of simple construction which is capable of holding a pad device and a magnetic shielding plate in the required positions for ensuring that a recording tape contacts the recording head of a player with suitable pressure.

Another object of the present invention is to provide a magnetic recording tape cartridge which is readily adaptable to the installation of a pad device and magnetic shielding plate in their respective given positions.

In order to achieve such objects, according to the present invention, there is provided a magnetic recording tape cartridge having a bottom section and a top section assembled together as a case for providing a tape chamber for containing a recording tape wound on a pair of reels, the intermediate portion of the recording tape being adapted to advance along a predetermined path defined along a plurality of openings formed in the front wall of the case, a magnetic shielding plate, a pad device composed of a resilient plate disposed to face one of the openings to which a recording head of a tape player is inserted and a pair of stepped ribs extending in the backward direction from positions near the front wall with such a height that the top surface of each is closely opposed to the bottom edge of the plate of the pad device so that the pad device is held in the required position.

These and other objects and features of the present invention will be apparent from the description given hereinafter and the accompanying drawings which, while indicating preferred embodiments of the present invention, are intended to be illustrative only, and not limitative of the present invention.

DETAILED DISCUSSION

Figure 1:
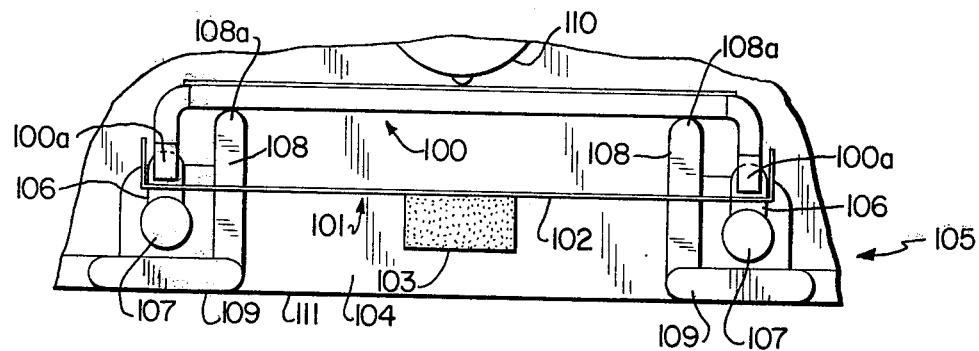
FIG. 1 is an enlarged plan view of an essential portion of a conventional prior art magnetic recording tape cartridge.
Figure 2:
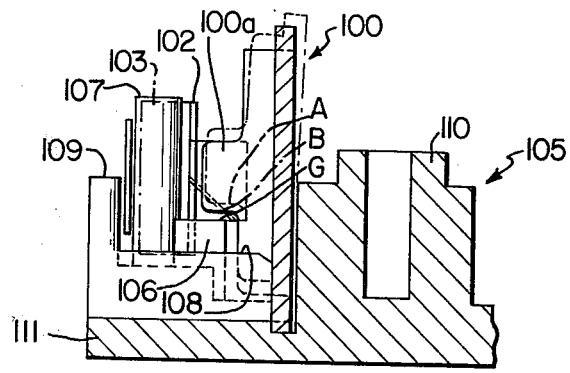
FIG. 2 is a vertical sectional side view of the magnetic recording tape cartridge shown in FIG. 1.
Figure 3:
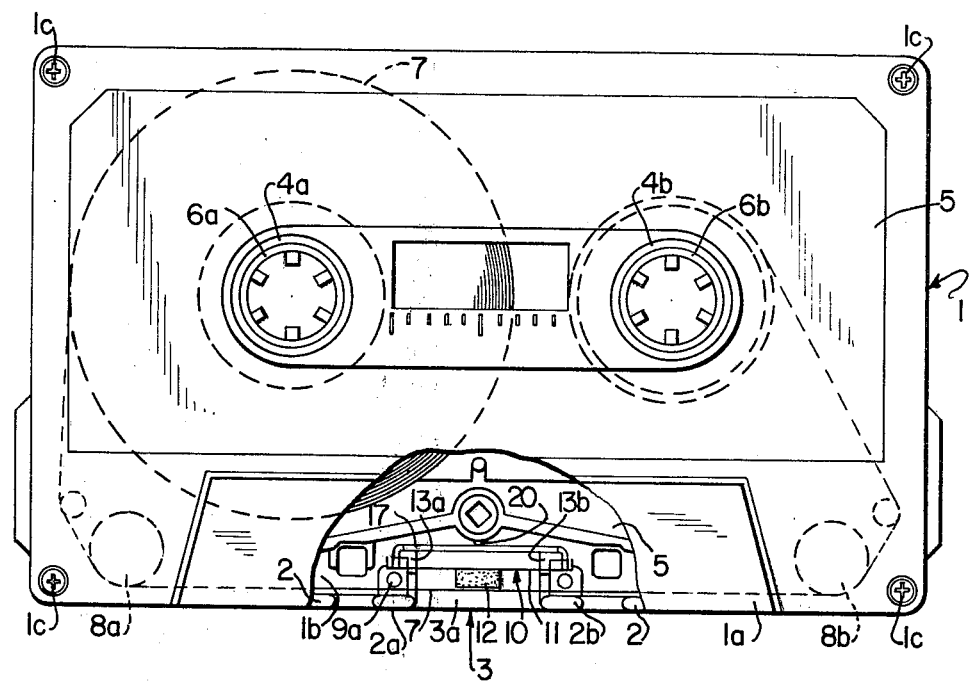
FIG. 3 is a partially cut out plan view of an embodiment of a magnetic recording tape cartridge according to the present invention.

FIGS. 1 and 2 with respect to the prior art magnetic recording tapes have been previously discussed.

Referring to FIGS. 3 through 6, there is seen a magnetic recording tape cartridge of the present invention comprising a case generally designated 1 of the so called Philips type "Compact cassete" composed of a bottom section 1b and a top section 1a, each section of the case being made of a plastic material, such as a polystyrene resin. Each section of the case, 1a and 1b, includes a front wall 2, with a plurality of openings including a central opening 3 for insertion of a recording head of a tape recorder (not shown). The cartridge further includes a pair of side walls, a rear wall and a pair of holes 4a and 4b defined on the bottom plate 5 of each of the sections. Both sections of the case 1 are assembled to provide a tape chamber and tightened together by means of screws 1c passed through the bottom plate of the top section 1a and engaging the threads in respective screw inserting holes (not shown) provided on the respective corners of the bottom plate of the bottom section 1b.

A pair of reels 6a and 6b is rotatably mounted within the tape chamber of the cartridge case 1 being engaged in the insertion holes, and a magnetic recording tape 7 is wound on the reels 6a and 6b, the intermediate portion of the recording tape 7 being stretched between a pair of guide rollers 8a and 8b and passed through the predetermined path defined along the front wall 2. Upon rotation of the reels 6a and 6b, the recording tape pack on one of the reels is released therefrom and in turn is taken up by the other reel in a known manner.

Opposing to the central opening 3 for insertion of the magnetic recording head, there is provided a pad device 10 composed of a resilient plate 11 and a small cushioning block 12 made of a felt or a synthetic foam material fitted at the intermediate portion of the plate 11, in order to ensure that the recording tape 7 contacts the recording head with suitable pressure during the recording or playing back of the magnetic recording cartridge by a player.

The resilient plate 11 is formed by means of, for example, a punch press from phosphor bronze with its two ends bent so as to extend toward the backside of the case. It has a thickness of about 80μ and a width of about 2.5 mm.

Adjacent to the respective front wall pieces 2a and 2b which define the central opening 3, there are disposed a pair of tape guide pins 9a and 9b by which the recording tape 7 is guided to pass the predetermined path along the front wall.

From each of the tape guide pins 9a and 9b, base pieces 19a and 19b are projected in a backward direction for supporting the respective end portions of the resilient plate 11 of the pad device 10 on its flat upper surface.

Figure 5:
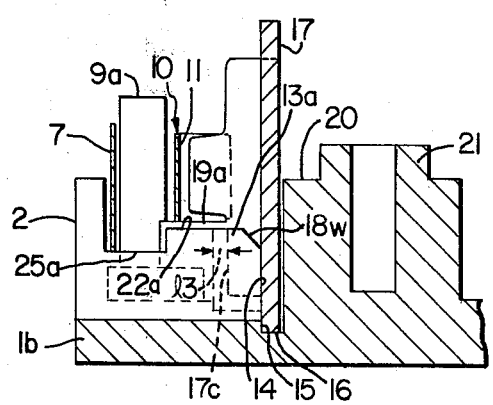
FIG. 5 is a cross-sectional view taken along the line III—III in FIG. 4.

A pair of stepped ribs 13a and 13b with a generally "L" configuration in plan view are symmetrically protruded from the bottom plate 5 of the bottom section 1b of case 1, extending from the inner end portion of the respective wall pieces 2a and 2b in a backward direction beyond the base pieces 19a and 19b and terminating with a vertical rear end face 14 at a position coinciding with the front inside face 15 of a laterally elongated slot 16 in which a bottom portion of a magnetic shielding plate of permalloy 17 is fitted as shown in FIG. 5.

The bent legs 18 providing the "L" configuration of each of the pair of stepped ribs 13a l and 13b protrude outwardly and extend laterally to terminate at their respective positions adjacent to respective base pieces 19a and 19b. The respective upper corners of the bent legs 18 are shaped in the form of a wedge 18w so as to facilitate insertion of the magnetic shielding plate 17 into the slot 16.

Figure 4:
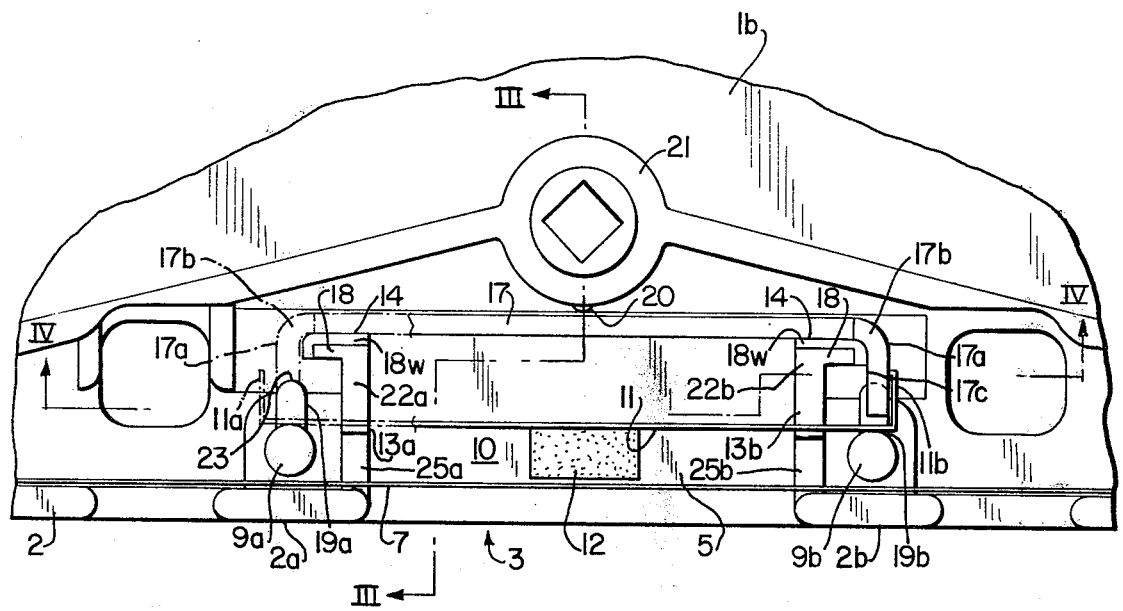
FIG. 4 is an enlarged plan view showing an essential portion of the magnetic recording tape cartridge shown in FIG. 3.
Figure 6:
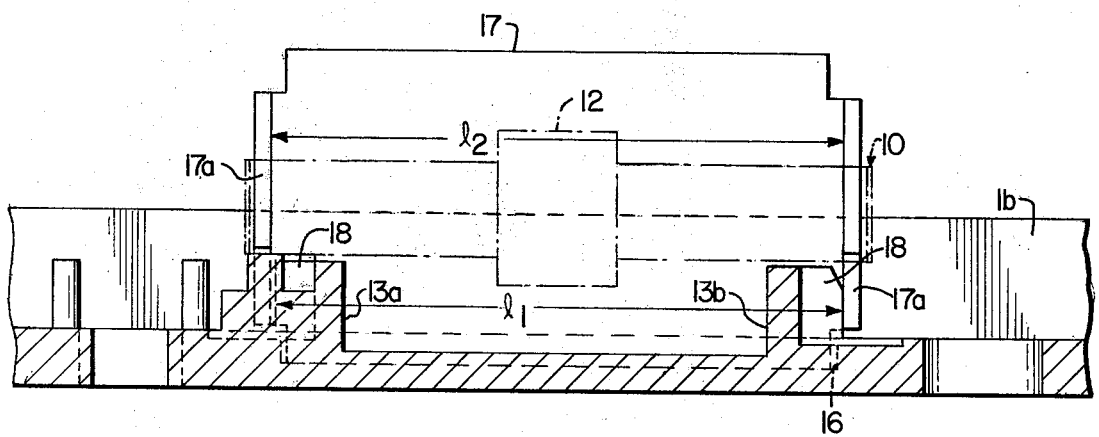
FIG. 6 is a frontal-sectional view taken along the line IV—IV in FIG. 4.

As shown best in FIGS. 4 and 5, the front half portions 25a and 25b of the stepped ribs 13a and 13b are considerably lower in height than the upper surface of the base pieces 19a and 19b, so that the upper surface of the front half portion of the respective stepped ribs contact the lower edge of the magnetic recording tape 7 to guide and regulate the recording tape 7 in a proper position. However, the upper surfaces of the rear half portions 22a and 22b of ribs 13a and 13b are raised so as to be flush with or slightly lower than the upper surfaces of the base pieces 19a and 19b so as to allow the resilient plate 11 to bend when the plate 11 is pushed in the backward direction upon insertion of a magnetic recording head.

According to the present invention the magnetic shielding plate 17 is installed in the cartridge case 1 in such a manner that both bent corners 17b of the magnetic shielding plate 17 are engaged by the ends of the respective bent legs 18 of the stepped ribs 13a and 13b, thus securing the magnetic shielding plate 17 within the elongated slot 16, as specifically shown in FIG. 5. The front face of the lower portion of the magnetic shielding plate 17 contacts or opposes closely the vertical rear end surfaces 14 of the respective ribs 13a and 13b, and their lateral extensions 18, while the rear face of the magnetic shielding plate 17 opposes closely the projection 20 of the boss 21, thus further supporting the magnetic shielding plate 17 such that it stands vertically within the groove 16. Thus, the magnetic shielding plate 17 engages both ends of the leg portions 18 and the rear end surfaces 14 of the stepped ribs 13a and 13b to ensure that the plate 17 is correctly and securely positioned.

After the magnetic shielding plate 17 is mounted as mentioned above, the pad device 10 is mounted in parallel with and in front of the magnetic shielding plate 17 in such a manner that the legs 11a and 11b of the resilient plate 11 are situated outside of both of the legs 17a of the magnetic shielding plate 17, and the lower edge of the resilient plate 11 contacts the upper surface of the respective base pieces 19a and 19b at both end portions of the resilient plate 11 closely facing the upper surface of the respective rear half portions 22a and 22b of ribs 13a and 13b. By this construction, during installation of the pad device 10 relative to the base pieces 19a and 19b in the process of making the recording tape cartridge, even if the magnetic shielding plate 17 accidentally shifts upward due to vibration or shock caused by a conveyor carrying the cartridge, thus creating a possible gap between the front end face of the leg 17a of the magnetic shielding plate 17 and the base pieces 19a or 19b, the resilient plate 11 is effectively prevented from falling into the gap since the resilient plate 11 is further supported by the higher upper faces 22a and 22b of the ribs 13a and/or 13b. Accordingly, the pad device 10 can at all times be properly and readily utilized and the efficiency of the commercial production of the cartridge is substantially improved.

According to the present invention, the front half portions 25a and 25b and rear half portions 22a and 22b of each of the stepped ribs 13a and 13b are separated such that the upper surfaces of the front half portions serve to regulate the level of the magnetic recording tape 7 and the upper surfaces of the rear half portions support the resilient plate 11. It is required that the rear half portion of each of the ribs 13a and/or 13b be of such a length $l_3$ that their starting ends are positioned ahead of the backward end 23 of the base pieces 19a and 19b toward the front of the case and at least their rear ends are positioned adjacent to the front edge 17c of the magnetic shielding plate 17, and always such that the resilient plate 11 is supported and the shielding plate 17 engaged as described above.

Alternatively, when the ribs 13a and 13b extend to the vicinity of the slot 16 for receiving the magnetic shielding plate 17, and they are bent to the lateral external sides to form the bent portions 18 and the distances $l_1$ between the two ends of these bent legs 18 is made nearly equal to the distances $l_2$ between the bent pieces 17a of the magnetic shield 17, displacement of the magnetic shield 17 in the lateral direction is restricted so that the bent pieces 17a are always positioned on the base pieces 19a and 19b. As a result, the pad device 10 is held in a correct position by means of the guide pins 9 and the two end bent pieces 17a of the magnetic shielding plate 17.

When a wedged surface 18w of the bent legs 18 is formed with an angle between about 30 to 45 degrees relative to the vertical plane, the magnetic shielding plate 17 can be readily installed relative to the base pieces 19a and 19b in a downward direction. In the above embodiment, the slot 16 for mounting the magnetic shield 17 may be omitted. Furthermore, the bent legs 18 of the rib 13a or 13b may extend to the corner of the bent portion 17a of the magnetic shielding plate 17 from the ribs 13a or 13b with a slant angle relative to the rib.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A magnetic recording tape cartridge comprising in combination:
   (a) a bottom section and a top section assembled together by a fastening means so as to provide a cartridge case having a front wall and a tape chamber with a plurality of openings formed in said front wall, one opening of which accommodates a magnetic recording tape head of a tape player,
   (b) a pair of reels accommodated in said tape chamber, rotatably mounted relative to respective drive shaft insertion holes defined in said cartridge case,
   (c) a magnetic recording tape wound around said pair of reels, the intermediate portion of said recording tape being stretched between said reels running along a predetermined path defined by said plurality of openings formed in said front wall,
   (d) a pair of tape guide pins protruding from the bottom section of said cartridge case positioned adjacent to both sides of said recording tape head opening, each guide pin having a base piece projecting backward from said respective guide pin,
   (e) a magnetic shielding plate disposed in the inner part of the said tape chamber having a generally elongated portion with both ends thereof bent perpendicular to said elongated portion, said elongated portion extending parallel with said tape path so as to face said recording tape head opening, both ends of said magnetic shielding plate being mounted on said respective base pieces,
   (f) a pad device composed of a resilient plate with both ends thereof bent perpendicular to the intermediate portion of said plate and a cushioning block fixed to the center portion of the resilient plate, said pad device being disposed parallel to said magnetic shielding plate so that said cushioning block is opposed to the magnetic recording tape head, with the recording tape sandwiched therebetween, upon the insertion of said recording head through the recording tape head opening, said pad device being mounted at the ends thereof on the respective corresponding base pieces,
   (g) a pair of stepped ribs provided at least on the bottom section of said cartridge case at both sides of the recording tape head opening, juxtapositioned between said guide pins with said base piece projections and said opening, each of said ribs having a front half portion which steps up to a rear half portion, the height of the rear half portions of said ribs being equal to or slightly lower than the height of said base pieces, and the height of the front half portions of said ribs being lower than the upper surface of said rear half portions such that the upper surface of said front half portions contact the lower edge of said magnetic recording tape, the upper surface of said rear half portions acting to support the resilient plate of said pad device when the pad device is displaced downwardly from a normal position,
   (h) a pair of lateral protrusions provided on the bottom section of said cartridge case, being disposed at the rear of the stepped ribs for engaging the bent ends of said magnetic shielding plate and the front face of the lower portion of said magnetic shielding plate closely contacting the vertical rear end surface of said ribs so as to correctly and securely position said magnetic shielding plate, whereby the ribs thus insure positive seating of the resilient plate and preclude inadvertent misplacement thereof.

2. A magnetic recording tape cartridge according to claim 1 wherein each of said lateral protrusions is connected with the rear ends of corresponding stepped ribs to form an "L" configuration.

3. A magnetic recording tape cartridge according to claim 2 wherein the respective upper corners of the rear half portions of said stepped ribs including said lateral protrusions are shaped in the form of a wedge.

* * * * *